(12) United States Patent
Vladimerou et al.

(10) Patent No.: US 10,933,880 B2
(45) Date of Patent: Mar. 2, 2021

(54) SYSTEM AND METHOD FOR PROVIDING LANE CURVATURE ESTIMATES

(71) Applicant: Toyota Motor Engineering & Manufacturing North America, Inc., Plano, TX (US)

(72) Inventors: Vladimeros Vladimerou, Whitmore Lake, MI (US); Miles J. Johnson, Ann Arbor, MI (US); Christopher J. Smalley, Canton, MI (US); Matthew W. Dreisbach, Kentwood, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 232 days.

(21) Appl. No.: 16/250,283

(22) Filed: Jan. 17, 2019

(65) Prior Publication Data
US 2020/0231164 A1    Jul. 23, 2020

(51) Int. Cl.
*B60W 40/072* (2012.01)
*G06N 20/00* (2019.01)
*G05D 1/02* (2020.01)
*B60W 30/12* (2020.01)

(52) U.S. Cl.
CPC .......... *B60W 40/072* (2013.01); *B60W 30/12* (2013.01); *G05D 1/0221* (2013.01); *G05D 1/0276* (2013.01); *G06N 20/00* (2019.01); *G05D 1/0231* (2013.01); *G05D 1/0255* (2013.01); *G05D 1/0257* (2013.01); *G05D 2201/0213* (2013.01)

(58) Field of Classification Search
CPC .... B60W 40/072; B60W 30/12; G06N 20/00; G05D 1/0221; G05D 1/0276; G05D 1/0231; G05D 1/0255; G05D 1/0257; G05D 2201/0213
USPC .......................................................... 701/23
See application file for complete search history.

(56) References Cited

U.S. PATENT DOCUMENTS

| | | | |
|---|---|---|---|
| 6,385,539 B1 | 5/2002 | Wilson et al. | |
| 7,034,742 B2 | 4/2006 | Cong et al. | |
| 7,522,091 B2 | 4/2009 | Cong et al. | |
| 7,933,433 B2 | 4/2011 | Ogawa | |
| 2003/0218563 A1* | 11/2003 | Miyahara | G01S 13/723 |
| | | | 342/70 |
| 2010/0191461 A1 | 7/2010 | Zeng | |
| 2012/0062747 A1* | 3/2012 | Zeng | G06K 9/00798 |
| | | | 348/149 |

(Continued)

*Primary Examiner* — Gertrude Arthur Jeanglaude
(74) *Attorney, Agent, or Firm* — Christopher G. Darrow; Darrow Mustafa PC

(57) ABSTRACT

In one embodiment, example systems and methods relate to a manner of providing lane curvature estimations. As vehicles travel, lane curvature estimates for lane segments as provided by the vehicle lane curvature estimation systems are collected. The estimated lane curvatures and the actual paths of the vehicles as they traveled in the lane segments are used as training data for a model that can both determine if a lane curvature estimate for a lane segment is likely incorrect and provide a correct lane curvature estimate. When a vehicle later travels such a lane segment, the model can be used to provide the vehicle with a correct lane curvature estimate. The correct estimate can be used by the vehicle in place of an estimate generated by the existing lane curvature estimation system of the vehicle.

20 Claims, 9 Drawing Sheets

(56) References Cited

U.S. PATENT DOCUMENTS

| | | |
|---|---|---|
| 2016/0046290 A1 | 2/2016 | Aharony et al. |
| 2016/0140848 A1 | 5/2016 | Kim et al. |
| 2016/0169683 A1 | 6/2016 | Lynch |
| 2016/0314360 A1* | 10/2016 | Kizumi .............. G06K 9/00798 |
| 2016/0325753 A1 | 11/2016 | Stein et al. |
| 2017/0193338 A1 | 7/2017 | Huberman et al. |
| 2017/0234689 A1 | 8/2017 | Gibson et al. |

* cited by examiner

SYSTEM AND METHOD FOR PROVIDING LANE CURVATURE ESTIMATES

TECHNICAL FIELD

The subject matter described herein relates, in general, to a system and method for providing lane curvature estimates, and in particular, to providing lane curvature estimates using a model trained on lane curvature estimates and curvatures of observed vehicle paths.

BACKGROUND

Vehicles are equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems such as autonomous and semi-autonomous driving systems can perceive the noted aspects and accurately plan and navigate accordingly.

In the context of lane prediction, observations of a surrounding environment by sensors of the vehicle may be used to estimate a curvature of a lane for lane keeping functions, and other autonomous and semi-autonomous vehicle modes. However, as lane markings vary in quality and type, lane curvature estimating can be difficult. In addition, location specific conditions such as poor lighting due to trees or other obstructions and weather conditions can also make lane curvature estimating difficult. Because autonomous and semi-autonomous driving modes rely on such lane curvature estimations for navigation and other safety features, it is important that the curvature estimations be accurate.

SUMMARY

In one embodiment, example systems and methods relate to a manner of providing lane curvature estimations. As vehicles travel, lane curvature estimates for lane segments as provided by the vehicle lane curvature estimation systems are collected. The estimated lane curvatures and the actual paths of the vehicles as they traveled in the lane segments are used as training data for a model that can both determine if a lane curvature estimate for a lane segment is likely incorrect and can provide a correct lane curvature estimate. When a vehicle later travels such a lane segment, the model can be used to provide the vehicle with a correct lane curvature estimate. The correct estimate can be used by the vehicle in place of an estimate generated by the existing lane curvature estimation system of the vehicle.

In one embodiment, a lane curvature system for determining lane curvature estimates is disclosed. The lane curvature system includes one or more processors and a memory communicably coupled to the one or more processors. The memory stores a curvature estimation module including instructions that when executed by the one or more processors cause the one or more processors to receive first sensor data from one or more sensors associated with a vehicle traveling on a first lane segment of a plurality of lane segments, and according to the received first sensor data, estimate a curvature of the first lane segment at a first location in the first lane segment. The memory further stores a curvature correction module including instructions that when executed by the one or more processors cause the one or more processors to determine a path traveled by the vehicle in the first lane segment, determine a curvature of the path traveled by the vehicle in the first lane segment, determine a difference for the first lane segment between the estimated curvature of the first lane segment at the first location and the determined curvature of the path traveled by the vehicle in the first lane segment, and provide the determined difference for the first lane segment, the estimated curvature of the first lane segment, and an identifier of the location in the first lane segment as first training data to a lane curvature model.

In one embodiment, a method for determining a lane curvature estimate is disclosed. The method includes receiving a first estimated curvature of a lane segment of a plurality lane segments at a location for a first vehicle traveling in the lane segment. The method includes receiving a path traveled by the first vehicle in the lane segment. The method includes determining a curvature of the path traveled by the first vehicle in the lane segment. The method includes determining a difference for the lane segment between the first estimated curvature of the lane segment at the location and the determined curvature of the path traveled by the first vehicle. The method includes providing the determined difference, the first estimated curvature of the lane segment, and an identifier of the location in the lane segment as training data to a lane curvature model.

In one embodiment, a non-transitory computer-readable medium for determining a lane curvature estimate is disclosed. The non-transitory computer-readable medium includes instructions that when executed by one or more processors cause the one or more processors to perform one or more functions. The instructions include instructions to receive an identifier of a first location in a first lane segment of a plurality of lane segments for a first vehicle traveling on the first lane segment. The instructions include instructions to, according to the identified first location in the first lane segment and a lane curvature model, generate a first estimated curvature for the first lane segment at the first location. The instructions include instructions to provide the first estimated curvature of the first lane segment at the first location as input to one or more autonomous or semi-autonomous vehicle modes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
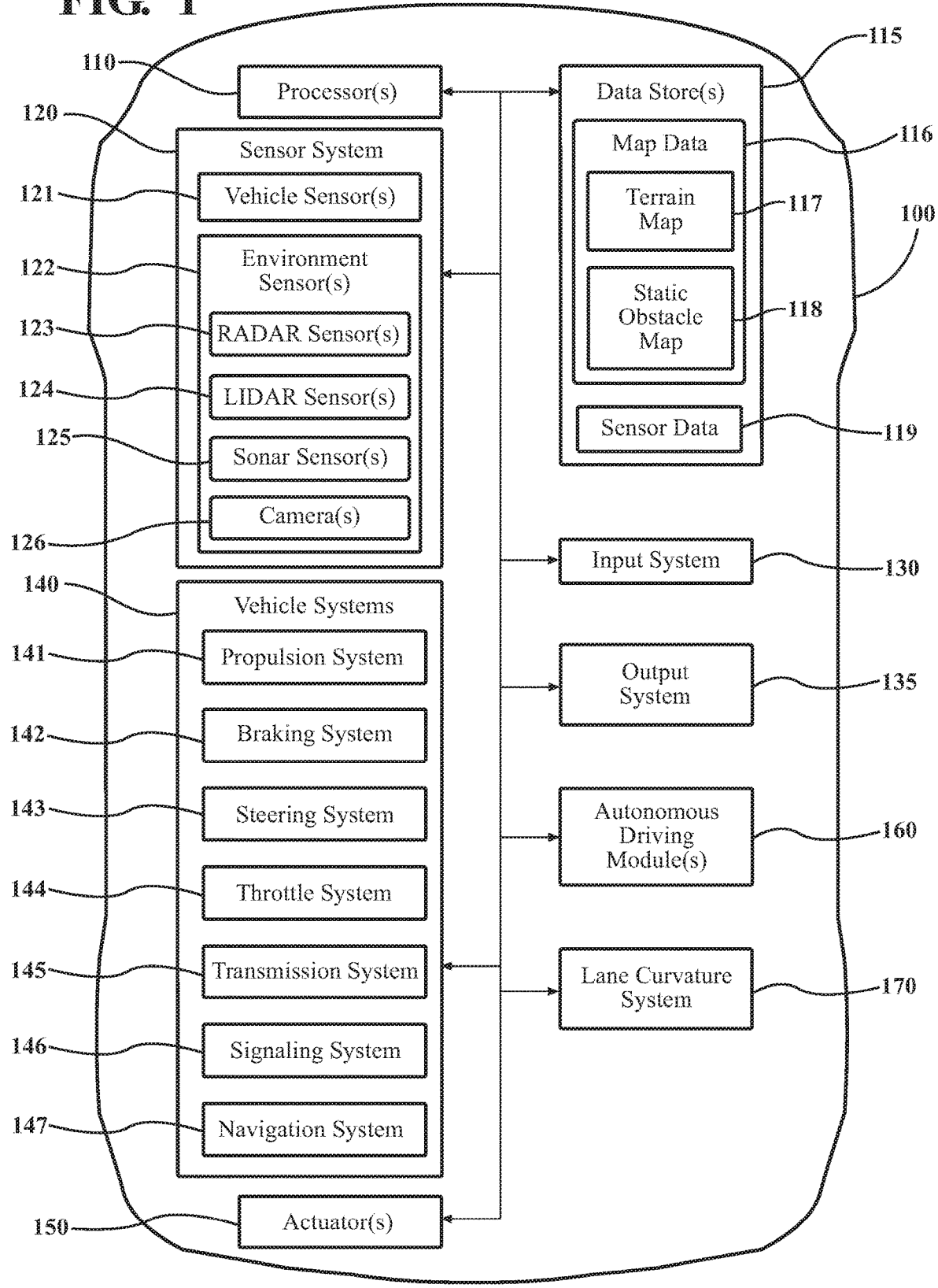
FIG. 1 illustrates one embodiment of a vehicle within which systems and methods disclosed herein may be implemented.

Systems, methods, and other embodiments associated with determining lane curvature estimates are provided. As mentioned previously, a vehicle may use sensors to make one or more lane curvature estimates with respect to a lane that the vehicle is traveling in. A lane curvature estimate may be an estimate of the curvature of the lane at some predetermined location in front of the vehicle in the lane. The lane curvature estimates can be used as input for one or more autonomous or semi-autonomous vehicle modes, such as lane assist.

While such lane curvature estimates are generally reliable, sometimes road or weather conditions can result in lane curvature estimation errors. Because drivers rely on lane curvature estimates for autonomous and semi-autonomous driving modes and other vehicle safety features, it is important that lane curvature estimates be correct.

Therefore, in one embodiment, a lane system and associated methods as disclosed herein provide for using a lane curvature model that is trained to identify, for a particular location in a lane segment, if a lane curvature estimate for the location in the lane segment is incorrect. In addition, the lane curvature model can further be trained to generate correct lane curvature estimates for identified locations in lane segments. To train the lane curvature model, lanes are divided into what are referred to herein as "lane segments." Each lane segment may be associated with an identifier that can be used to identify the lane segment. The lane segment identifier may be a number, for example. The lane segments can be approximately the same length (e.g., 10 meters, 50 meters, or 100 meters), or can be of different lengths.

As a vehicle travels on a lane segment, sensors associated with the vehicle are used to estimate a lane curvature for the lane segment. The lane curvature estimate is an estimate of the curvature of the lane segment at a location in front of the vehicle in the lane segment. The location may be 100 meters in front of the vehicle in the lane segment, for example. Other distances may be used or selected. Any method or technique for estimating the curvature of a lane may be used.

After the vehicle travels to the location in the lane segment, the vehicle determines the actual path that the vehicle traveled in the lane segment. The path of the vehicle may be determined using one or more global positioning system (GPS) sensors. The path of the vehicle may also be determined using inertial sensors and wheel encoders. Other methods for determining the path traveled by a vehicle in a lane segment may be used.

As may be appreciated, drivers tend to follow the curvature of the lane when steering a vehicle. Accordingly, the curvature of the path followed by the vehicle to the location in the lane segment can be used as a measure of the actual curvature of the lane segment at the location. The curvature of the path of the vehicle can be compared with the lane curvature estimate to determine whether the lane curvature estimate for the location in the lane segment was likely correct.

In one embodiment, a difference between the estimated lane curvature for a lane segment and the curvature of the path traveled by the vehicle in the lane segment is determined. The determined difference and an identifier of the location in the lane segment, may be provided as training data to the lane curvature model. As the vehicle (and other vehicles) travel the various lane segments over time, they continue to generate and provide such training data for locations in the lane segments. Machine learning (or other model generation techniques) may be used to generate and/or refine the lane curvature model using the training data. In one embodiment, the model may be generated using Local Weighted Projection Regression (LWPR). Depending on the embodiment, each lane segment may have its own associated lane curvature model, or a single lane curvature model may be used for all lane segments.

The lane curvature model is configured to receive as an input an identifier of a location in a lane segment, and to provide as an output a "correct" lane curvature estimate for the lane segment location. The correct lane curvature estimate may be based on some or all of the lane curvature estimates, and corresponding vehicle path curvatures received for the identified lane segment and lane segment locations. The correct lane curvature estimate can be a single estimate or may be a range of acceptable estimates. Depending on the embodiment, the correct lane curvature for a lane segment location may be the received lane curvature estimate with the lowest associated difference for that lane segment location.

In one embodiment, the lane curvature model is configured to receive as an input an identifier of a location in a lane segment and a lane curvature estimate for the identified location and provide as an output an indication as to whether the lane curvature estimate is correct. The indication may include an offset between the lane curvature estimate and what the lane curvature model determined to be the correct lane curvature for the lane segment location.

The lane curvature model described above can be used to provide a variety of safety and navigation features for vehicles that incorporate the lane curvature model. In one embodiment, the lane curvature model can be used in place of a traditional lane curvature estimation system. When a vehicle is traveling, rather than estimate the curvature of a lane segment using sensors or other means, the vehicle can use the lane curvature model to generate a lane curvature estimate for an upcoming location in the lane segment. The lane curvature estimate generated by the lane curvature model can then be used by one or more autonomous or semi-autonomous modes associated with the vehicle.

In another embodiment, the lane curvature model can be used to verify the lane curvature estimate generated by a vehicle. When a vehicle is traveling on a lane segment, the vehicle can generate a lane curvature estimate for an approaching location using sensors or other means. The vehicle can then check if the estimated lane curvature for the lane segment location is correct using the lane curvature model. The lane curvature model can verify that the estimate is correct, or if not, provide a correct estimate. The vehicle can then use the correct estimate as input to the one or more autonomous or semi-autonomous modes associated with the vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some embodiments, the vehicle 100 may be any robotic device or form of motorized transport that, for example, includes sensors to perform lane prediction, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a lane curvature system 170 that is implemented to perform methods and other functions as disclosed herein relating to estimating a curvature of a lane segment according to an identifier of a location in the lane segment and a lane curvature model. The noted functions and methods will become more apparent with a further discussion of the figures.

Figure 2:
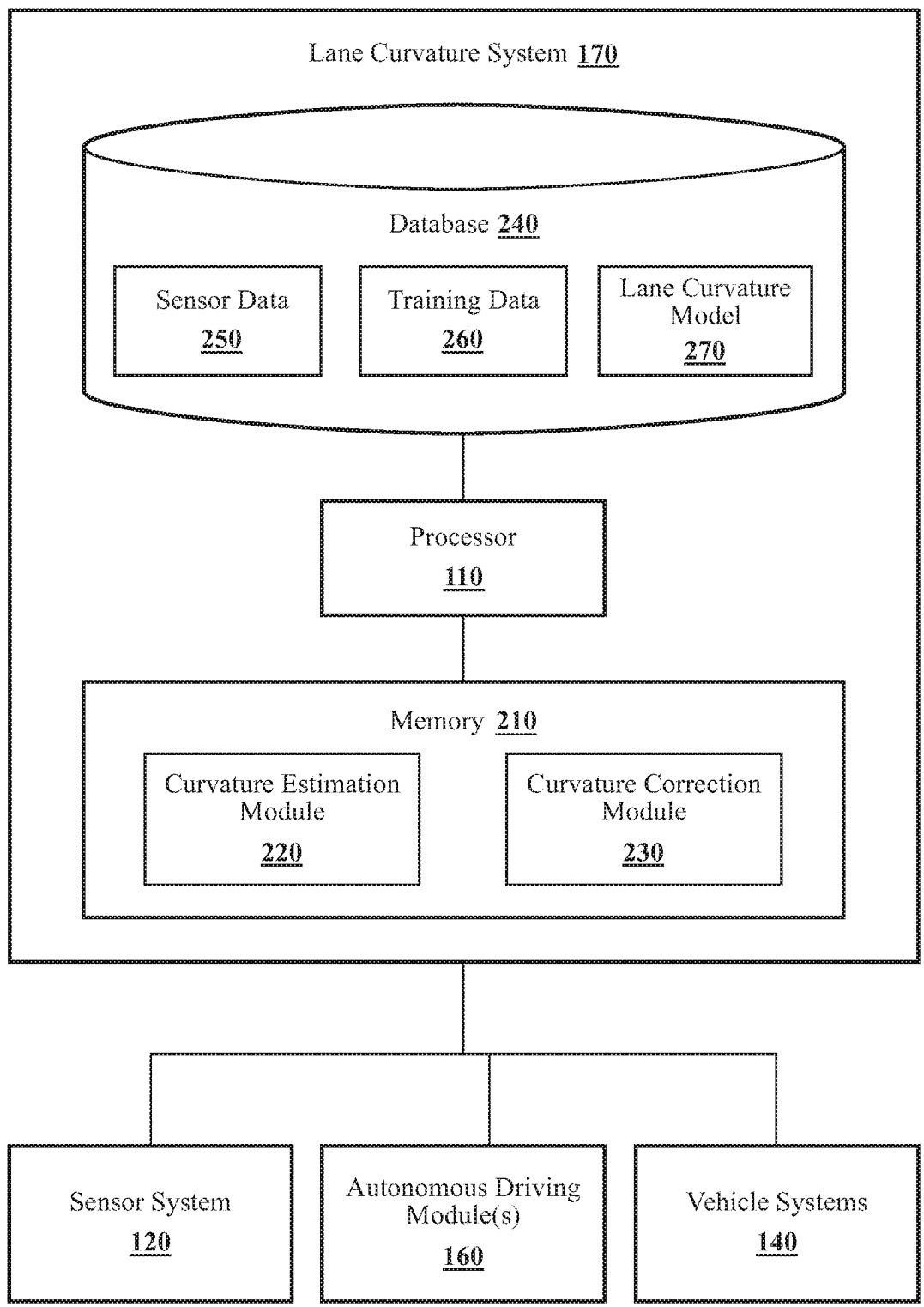
FIG. 2 illustrates one embodiment of a lane curvature system that is configured to generate lane curvature estimates for a lane segment.

With reference to FIG. 2, one embodiment of the lane curvature system 170 of FIG. 1 is further illustrated. The lane curvature system 170 is shown as including a processor 110 from the vehicle 100 of FIG. 1. Accordingly, the processor 110 may be a part of the lane curvature system 170, the lane curvature system 170 may include a separate processor from the processor 110 of the vehicle 100 or the lane curvature system 170 may access the processor 110 through a data bus or another communication path. In one embodiment, the lane curvature system 170 includes a memory 210 that stores a curvature estimation module 220 and a curvature correction module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the curvature estimation module 220 generally includes instructions that function to control the processor 110 to receive data inputs from one or more sensors of the sensor system 120 of the vehicle 100 that form sensor data 250, which embodies observations of the surrounding environment of the vehicle 100 including one or more lane segments. The present discussion will focus on acquiring the sensor data 250 using multiple sensors of the vehicle 100 including, for example, radar 123 and camera 126. However, it should be appreciated that the disclosed approach can be extended to cover further configurations of sensors such as LiDAR sensors with one or more cameras, different types of LiDARs and cameras, combinations of radars and cameras, sonar, use of a single sensor (e.g., camera), sensors of the surrounding vehicles leveraged via vehicle-to-vehicle communications (v2v), and so on.

Accordingly, the curvature estimation module 220, in one embodiment, controls the respective sensors to provide the data inputs in the form of the sensor data 250. Additionally, while the curvature estimation module 220 is discussed as controlling the various sensors to provide the sensor data 250, in one or more embodiments, the curvature estimation module 220 can employ other techniques to acquire the sensor data 250 that are either active or passive. For example, the curvature estimation module 220 may passively sniff the sensor data 250 from a stream of electronic information provided by the various sensors to further components within the vehicle 100. Moreover, as previously indicated, the curvature estimation module 220 can undertake various approaches to fuse data from multiple sensors when providing the sensor data 250 and/or from sensor data 250 acquired over a wireless communication link (e.g., v2v) from one or more of the surrounding vehicles. Thus, the sensor data 250, in one embodiment, represents a combination of measurements acquired from multiple sensors.

Furthermore, in one embodiment, the lane curvature system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250 along with, for example, other information that is used by the modules 220 and 230 such as training data 260 and a lane curvature model 270. Of course, in further embodiments, the sensor data 250, training data 260, and the lane curvature model 270 are stored within the memory 210 or another suitable location.

As a further explanation of the sensor data 250 that is leveraged by the curvature estimation module 220 to produce the noted determinations, the sensor data 250 can include 3D point cloud data, camera images and/or video from the camera 126, radar measurements, and so on. In further embodiments, the sensor data 250 includes information from further sensors (e.g., an IMU) that may be used to perform various tasks (e.g., motion blur correction) in support of the processes noted herein.

The curvature estimation module 220 is further configured to analyze the sensor data 250 to estimate the curvature of a lane segment that the vehicle 100 is traveling in. The lane curvature may be expressed in degrees. The estimated curvature is the curvature of the lane segment at a location in the lane segment. The location may be a predetermined distance from the vehicle 100 in the direction that the vehicle is traveling in.

For example, the curvature estimation module 220 may continuously, or at scheduled intervals, estimate the curvature of the lane segment at a location ten meters in front of the vehicle 100. The predetermined distance may be fixed or dynamic and may depend on variables such as vehicle speed, viability, weather, or lighting conditions, for example. The location in the lane segment may be a center of the lane segment, a left-side boundary of the lane segment, or a right-side boundary of the lane segment at the predetermined distance.

The curvature correction module 230 is configured to use the lane curvatures estimated by the curvature estimation module 220 to generate training data 260 for the lane curvature model 270. In an embodiment, the curvature correction module 230 generates training data 260 by, for each lane curvature estimated by the curvature estimation module 220 for a lane segment location, determining the actual path taken by the vehicle in the lane segment. The path may be a time-ordered sequence of positions of the vehicle 100 as the vehicle traveled through the lane segment to the location. The curvature correction module 230 receives the path the vehicle 100 from one or more vehicle systems 140 such as the navigation system 147. For example, the navigation system 147 uses a GPS to determine the vehicle 100 positions in the lane segment at various times and may provide the positions and times to the curvature correction module 230.

The curvature correction module 230 is further configured to store the estimated lane curvature, a curvature of the vehicle path, and an identifier of the lane segment and location as the training data 260. Thus, each piece of training data 260 may be a tuple that includes the estimated lane curvature, the path curvature, and an identifier of the lane segment and location. Other data may be included in the training data 260.

The curvature correction module 230 is further configured to train the lane curvature model 270 using the training data 260. In one embodiment, the curvature correction module 230 may generate the model 270, by for each tuple of training data 260, determining a difference between the estimated curvature and the curvature of the vehicle path. A low difference may indicate that the lane curvature estimate was a good estimate for the lane segment location, while a high difference may indicate that the lane curvature estimate was a bad estimate for the lane segment location.

The curvature correction module 230 is configured to use the determined differences and curvature estimates for each lane segment location to train the lane curvature model 270. In one embodiment, the curvature correction module 230 may train the lane curvature model 270 using a machine learning algorithm such as LWPR. However, any method for generating a predictive model may be used.

The curvature correction module 230 is configured to continuously update the lane curvature model 270 as curvature estimations and vehicle paths for identified lane segments and locations are received from the curvature estimation module 220. Thus, the lane curvature model 270 may continuously learn based on new training data 260. After enough tuples of training data 260 are received for a lane segment and location, the lane curvature model 270 may develop an understanding of what curvature estimation values are correct for the lane segment at the location, as well as what curvature estimation values are incorrect for the lane segment at the location. Depending on the embodiment, the lane curvature estimate with the lowest determined difference with respect to the curvature of the associated vehicle path may be determined to be the correct lane curvature estimate for a location in a lane segment.

In the embodiment described above, one lane curvature model 270 is used for all lane segments. However, in other embodiments each lane segment may be associated with a different lane curvature model 270. In such embodiments, the curvature correction module 230 may train each lane curvature model 270 using training data 260 corresponding to the associated lane segment.

The curvature correction module 230 is further configured to use the lane curvature model 270 to generate a correct curvature for a lane segment location. The curvature correction module 230 may receive an identifier of a location in a lane segment from the vehicle 100. The identified location may be from a lane segment that the vehicle 100 is currently traveling in, or is about to travel in. The curvature correction module 230 may use the lane curvature model 270 to generate the correct curvature for the identified location. The correct curvature may be based on the estimated curvatures and vehicle path curvatures received for the identified location in the training data 260. The correct curvature for the location may then be provided to one or more autonomous driving module(s) 160 associated with the vehicle 100.

The curvature correction module 230 is further configured to verify whether a lane curvature estimate is correct. The curvature correction module 230 may receive an identifier of a location in a lane segment and an estimated lane curvature for the location from the curvature estimation module 220. The curvature correction module 230 may use the lane curvature model 270 and the identified location in the lane segment to determine if the estimated lane curvature is a correct lane curvature estimate. If the lane curvature estimate is correct, then the estimated lane curvature may then be provided to one or more autonomous driving module(s) 160 associated with the vehicle 100.

If the lane curvature estimate is not correct, the curvature correction module 230 may use the lane curvature model 270 to generate a correct lane curvature estimate. The generated correct lane curvature estimate may then be provided to one or more autonomous driving module(s) 160 associated with the vehicle 100. Alternatively, rather than provide the correct lane curvature estimate, the curvature correction module 220 may provide an offset that can be used to correct the incorrect lane curvature estimate.

Figure 3:
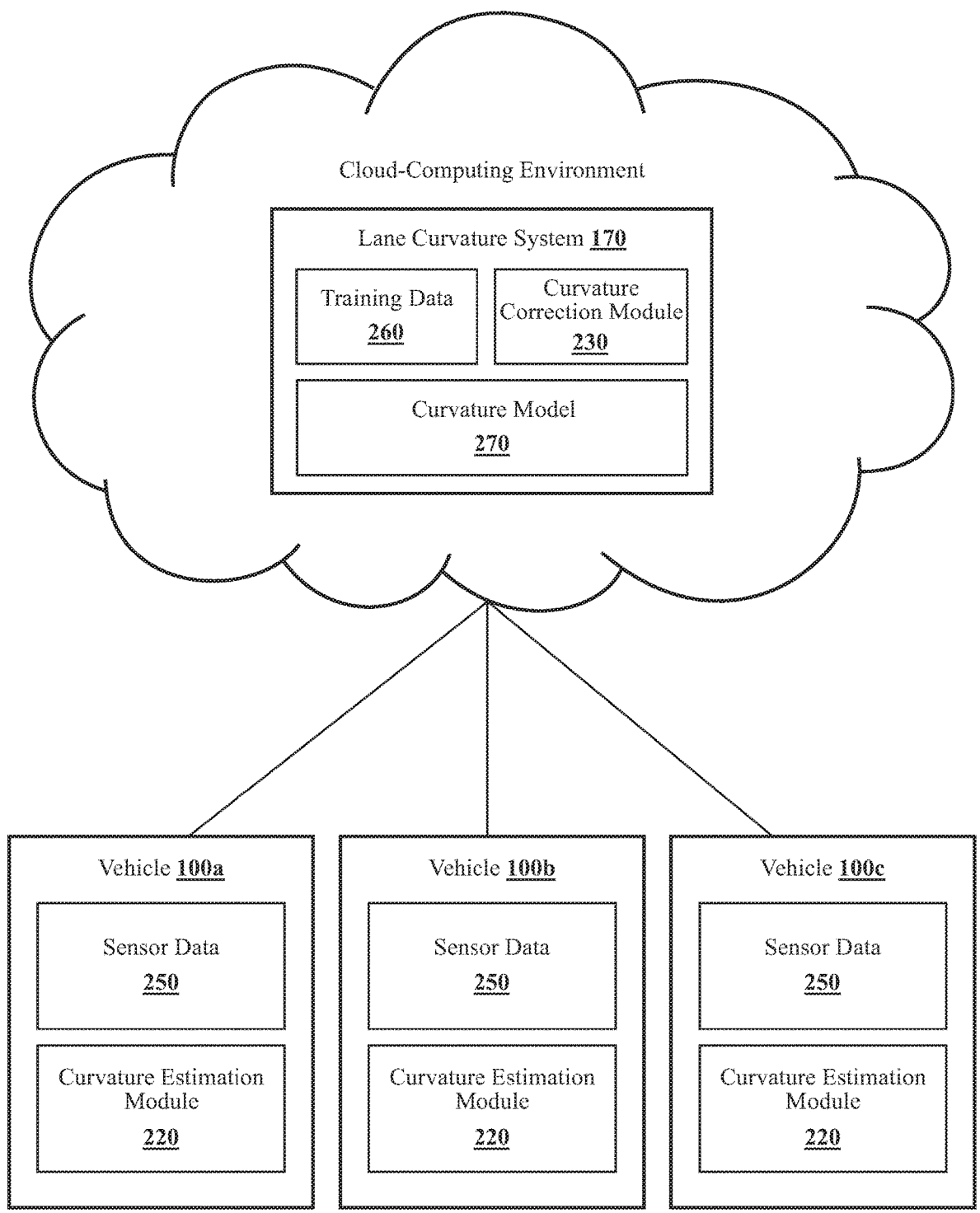
FIG. 3 illustrates one embodiment of the lane curvature system using a cloud-computing environment.

With reference to FIG. 3, another embodiment of the lane curvature system 170 of FIG. 1 is further illustrated. The lane curvature system 170 is implemented using a cloud-computing environment. In particular, the curvature correction module 230, training data 260, and lane curvature model 270 are implemented using the cloud-computing environment.

The lane curvature system 170 may be in communication with a plurality of vehicles 100 (i.e., the vehicles 100a, 100b, and 100c) through a network or other communication means. While only three vehicles 100 are shown, it is for illustrative purposes only; there is no limit to the number of vehicles 100 that may be supported.

In the embodiment shown, each vehicle 100 includes its own sensor data 250 and curvature estimation module 220. In particular, the curvature estimation module 220 associated with each vehicle 100 is configured to estimate the curvature of a lane segment at a location. The location may be a location at a predetermined distance of the vehicle 100 in the lane segment. The curvature estimation module 220 is further configured to send the estimate and an identifier of the lane segment and location to the curvature estimation module 220. The lane curvature estimate and identifier may be sent to the curvature correction module 230 of the cloud-computing environment through a network or other communication means connecting the cloud-computing environment and each of the vehicles 100.

The curvature correction module 230 is configured to receive the lane curvature estimates and identifiers from each of the vehicles 100. The curvature correction module 230 is further configured to, for each received identifier and lane curvature estimate, determine a path followed by the corresponding vehicle 100 in the identified lane segment. The curvature correction module 230 may determine the path for a vehicle 100 in a lane segment using position data (e.g., GPS data) associated with each vehicle 100. In one embodiment, the curvature correction module 230 receives the position data from each vehicle 100 and constructs the paths from the position data.

The curvature correction module 230 is configured to determine, for each estimated lane curvature and lane segment location, a difference between the estimated lane curvature and a curvature of the path taken by the vehicle 100 in the lane segment. The determined differences, estimated lane curvatures, and identifiers may be stored by the curvature correction module 230 as training data 260. The curvature correction module 230 may then generate and train the lane curvature model 270 using the training data 260 as described previously. As may be appreciated, by generating the lane curvature model 270 using data collected and received from a variety of vehicles 100 for a variety of lane segments, the ability of the lane curvature model 270 to generate and recognize correct lane curvature estimates for lane segment locations may be improved.

Figure 4:
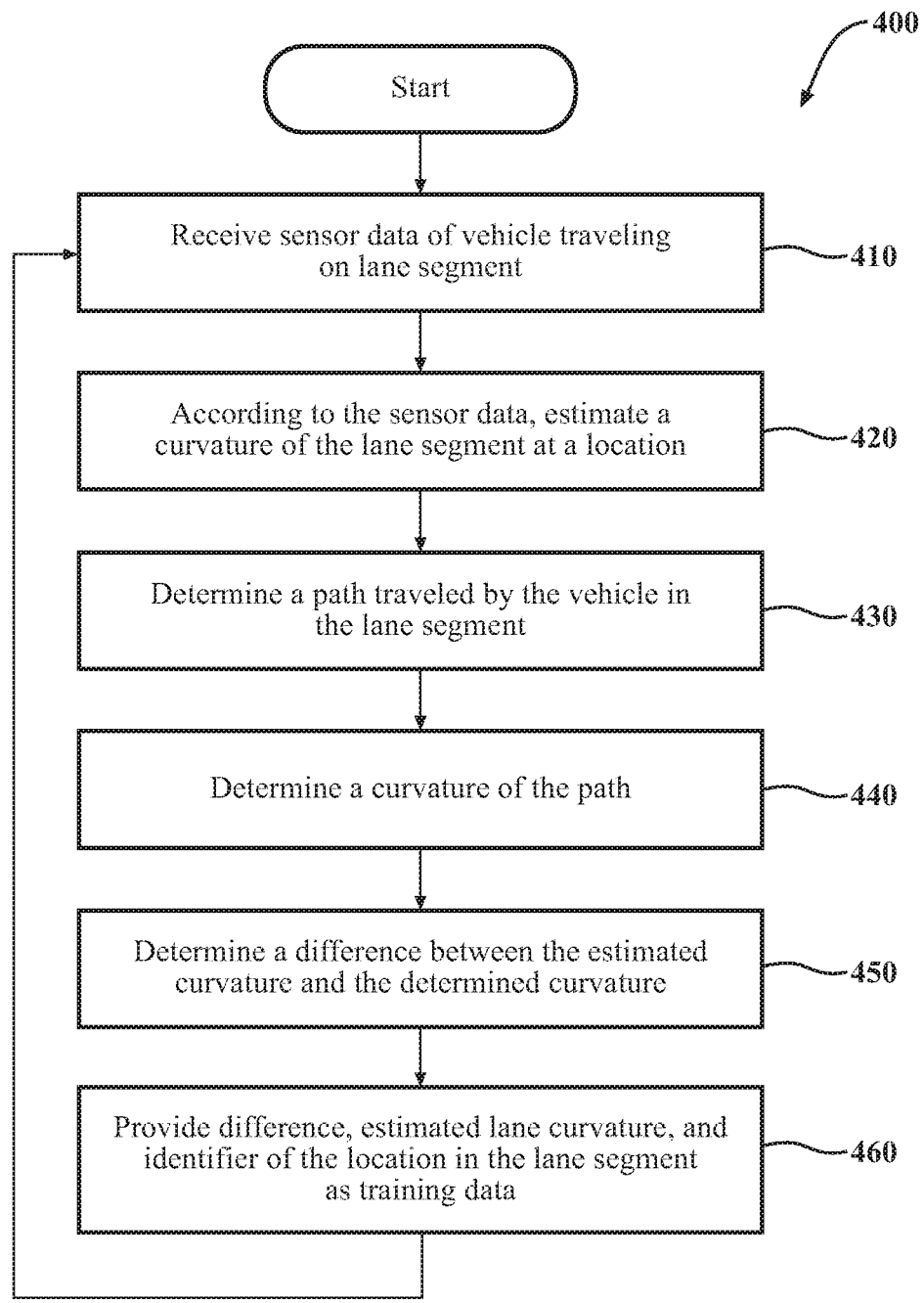
FIG. 4 illustrates a flowchart of a method that is associated with generating and providing training data to a lane curvature model.

Additional aspects of training a lane curvature model 270 will be discussed in relation to FIG. 4. FIG. 4 illustrates a flowchart of a method 400 that is associated with generating and providing training data to a lane curvature model 270. The method 400 will be discussed from the perspective of the lane curvature system 170 of FIGS. 1, 2, and 3. While the method 400 is discussed in combination with the lane curvature system 170, it should be appreciated that the method 400 is not limited to being implemented within the lane curvature system 170 but is instead one example of a system that may implement the method 400.

At 410, the curvature estimation module 220 receives sensor data 250 from the sensor system 120 of a vehicle 100 traveling on a lane segment. In one embodiment, the curvature estimation module 220 may receive sensor data 250 from the LiDAR sensor 124 and/or the camera 126 of the vehicle 100. Alternatively, or additionally, the curvature estimation module 220 controls the camera 126 and the radar 123 or another set of sensors to acquire the sensor data 250.

At 420, the curvature estimation module 220 estimates the curvature of the lane segment at a location according to the sensor data. In one embodiment, the curvature estimation module 220 may estimate the curvature of the lane segment at the location of the center of the lane segment at some predetermined distance from the vehicle 100. Any method for estimating a curvature of a lane segment may be used.

Figure 8:
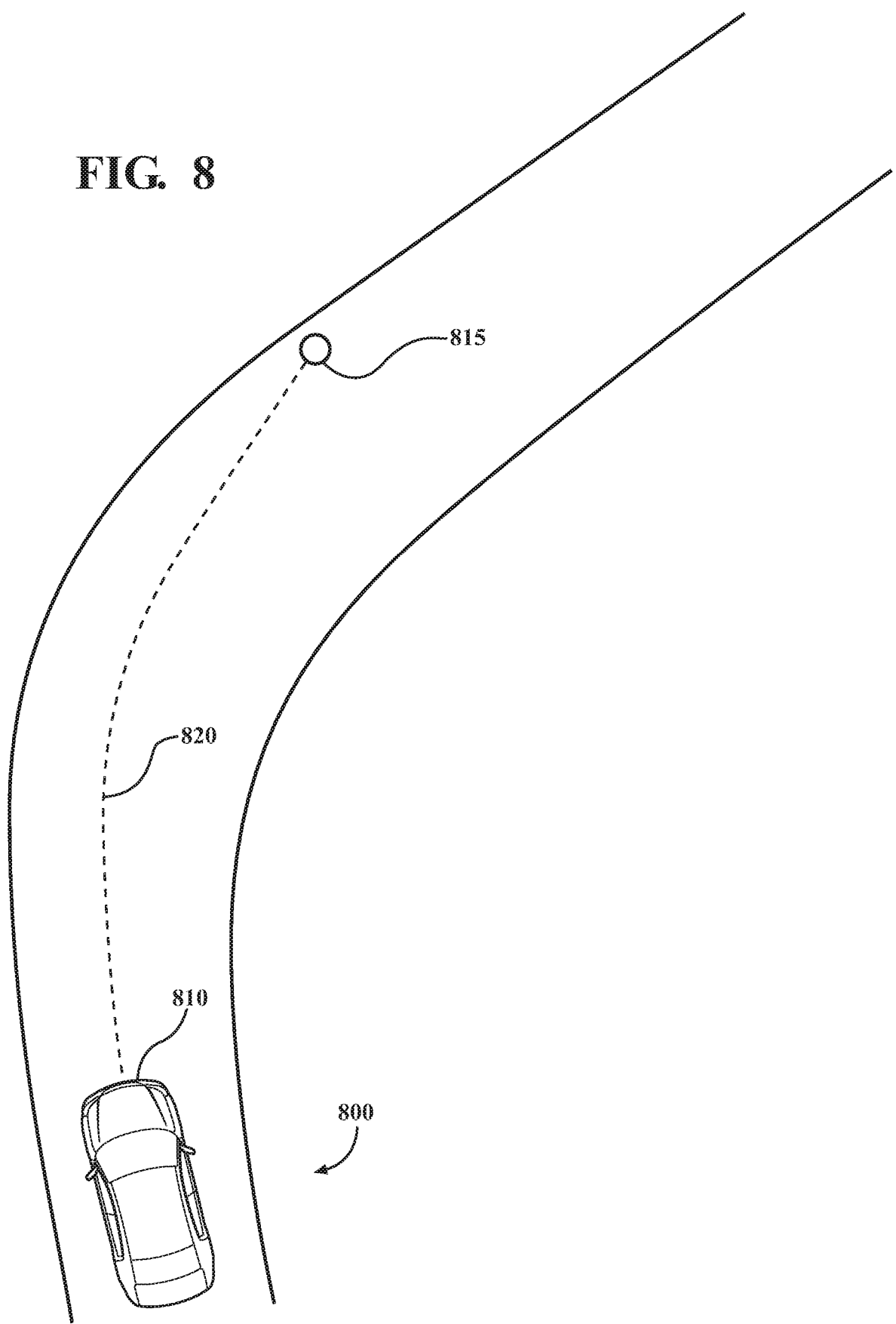
FIG. 8 illustrates an example vehicle traveling in a lane segment.

By way of example, FIG. 8 illustrates an example vehicle 810 traveling in a lane segment 800. The curvature estimation module 220 of the lane curvature system 170 associated with the vehicle 810 has estimated a location of the lane segment 800 at the predetermined distance. The estimated location is illustrated in FIG. 8 as the location 815. A path between the current location of the vehicle 810 in the lane segment and the location 815 is illustrated in FIG. 8 as the path 820. The curvature of the path 820 may be used as the estimated curvature of the lane segment at the location 815.

At 430, the curvature correction module 230 determines a path traveled by the vehicle in the lane segment. In one embodiment, the path may be actual path that the vehicle traveled in the lane segment and may be determined by the curvature correction module 230 using positions of the vehicle 100 provided by a GPS or other position determination component of the vehicle systems 140. In one embodiment, the curvature estimation module 220 and the curvature correction module 230 may be located on the same vehicle 100 (i.e., FIG. 2). In another embodiment, the curvature estimation module 220 may be located on the vehicle 100, while the curvature correction module 230 is part of a cloud-computing environment.

At 440, the curvature correction module 230 determines a curvature of the path traveled by the vehicle 100 in the lane segment. Any method for determining the curvature of a path may be used.

At 450, the curvature correction module 230 determines a difference between the estimated curvature of the lane segment and the determined curvature of the path. Any method for comparing or determining differences between curves or curvatures may be used.

Figure 9:
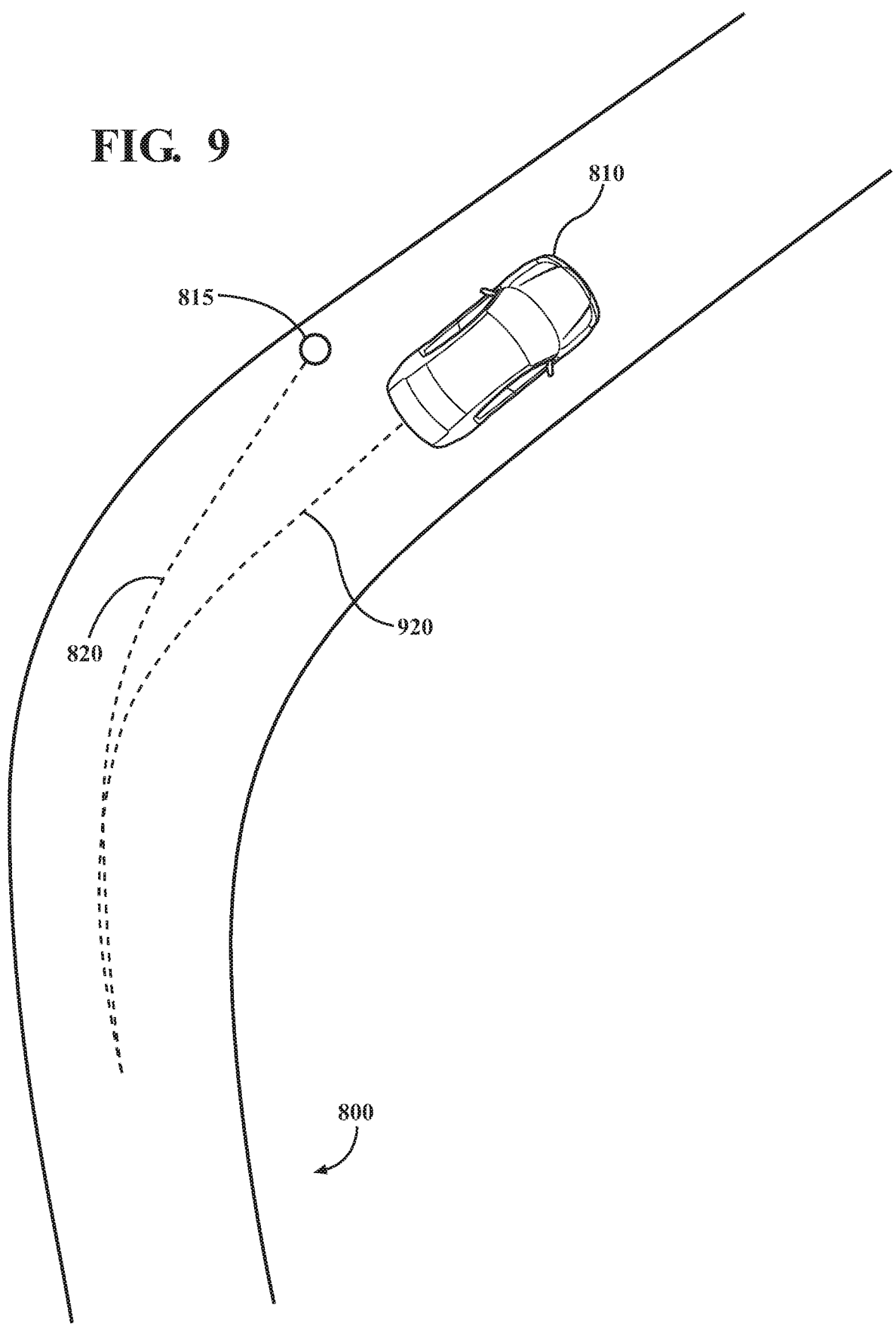
FIG. 9 illustrates an example vehicle after traveling the predetermined distance in the lane segment.

Continuing the example of FIG. 8, FIG. 9 illustrates the example vehicle 810 after traveling the predetermined distance in the lane segment 800. The actual path traveled by the vehicle in the lane segment 800 is illustrated as the path 920. The difference between the curvature of the path 820 (i.e., the estimated curvature of the lane segment) and the curvature of the path 920 (i.e., the curvature of the path actually taken by the vehicle 810 in the lane segment 800) may be determined by the curvature correction module 230

At 460, the curvature correction module 230 provides the determined difference, the estimated lane curvature, and identifier of the location in the lane segment as training data 260 to the lane curvature model 270. In some embodiments, the estimated lane curvature, the curvature of the vehicle path, and the identifier of the location in the lane segment may be provided as the training data 260. After providing the training data 260 to the lane curvature model 270, the method 400 may then return to 410 where the curvature estimation module 220 can receive additional sensor data 250 and estimate the curvature of the lane segment at a different location.

Figure 5:
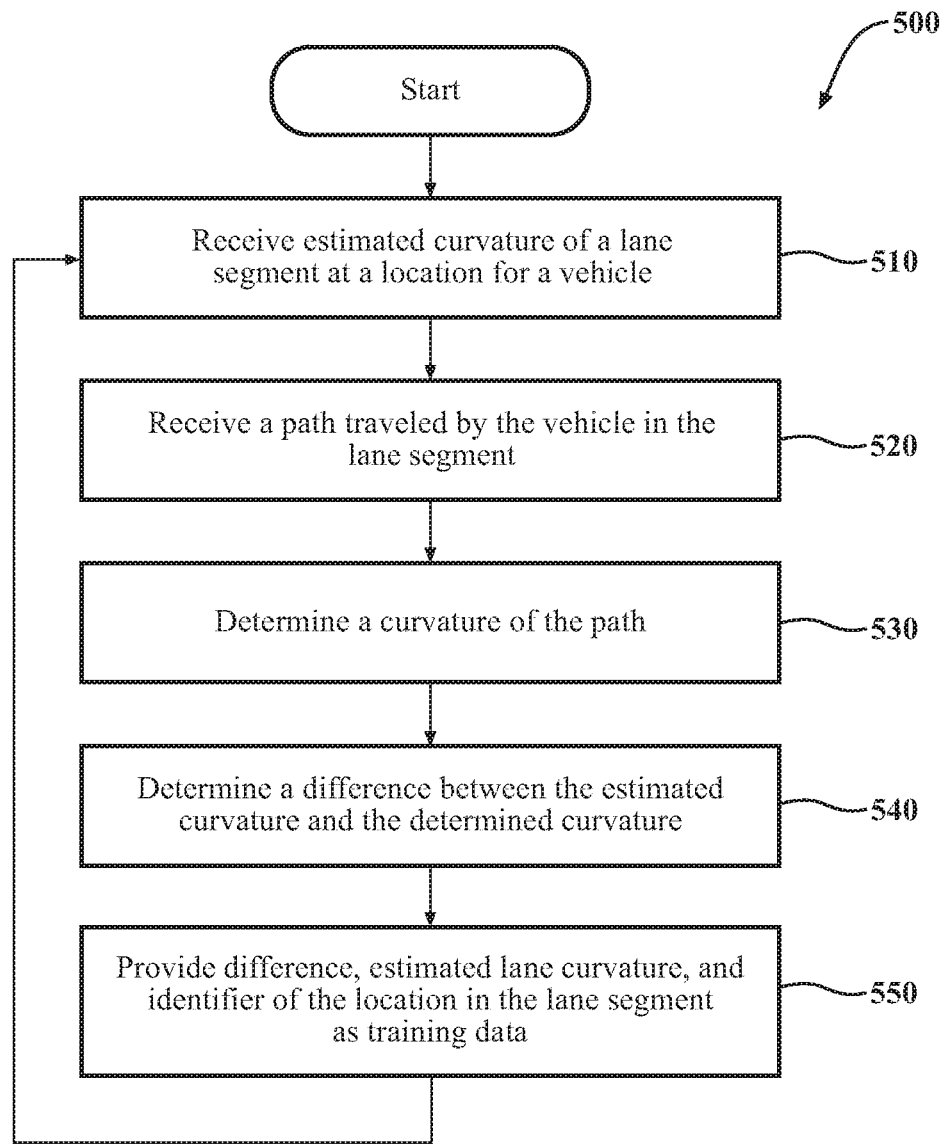
FIG. 5 illustrates a flowchart of a method that is associated with generating and providing training data to a lane curvature model.

Additional aspects of training a lane curvature model 270 will be discussed in relation to FIG. 5. FIG. 5 illustrates a flowchart of a method 500 that is associated with generating and providing training data to a lane curvature model 270. The method 500 will be discussed from the perspective of the lane curvature system 170 of FIGS. 1, 2, and 3. While the method 500 is discussed in combination with the lane curvature system 170, it should be appreciated that the method 500 is not limited to being implemented within the lane curvature system 170 but is instead one example of a system that may implement the method 500.

At 510, the curvature correction module 230 receives an estimated curvature of a lane segment at a location for a vehicle 100. The estimated curvature may be for a lane segment that the vehicle 100 is currently, or about to, travel in. The estimated curvature may have been generated by a curvature estimation module 220 from sensor data 250 collected by one or more sensors of the vehicle 100.

At 520, the curvature correction module 230 receives a path traveled by the vehicle in the lane segment. The path may be a time-ordered sequence of positions in the lane segment that represents the actual path taken by the vehicle in the lane segment. The path may be received by the curvature correction module 230 from a GPS or other component of the vehicle systems 140. In one embodiment, the curvature estimation module 220 and the curvature correction module 230 may be located on the same vehicle 100 (i.e., FIG. 2). In another embodiment, the curvature estimation module 220 may be located on the vehicle 100, while the curvature correction module 230 is part of a cloud-computing environment.

At 530, the curvature correction module 230 determines a curvature of the path traveled by the vehicle 100 in the lane segment. Any method for determining the curvature of a path may be used.

At 540, the curvature correction module 230 determines a difference between the estimated curvature of the lane segment and the determined curvature of the path. Any method for comparing or determining differences between curves or curvatures may be used.

At 550, the curvature correction module 230 provides the determined difference, the estimated lane curvature, and identifier of the location in the lane segment as training data 260 to the lane curvature model 270. After providing the training data 260 to the lane curvature model 270, the method 500 may then return to 510 where the curvature correction module 230 can receive another estimate of the curvature of the lane segment for a different location.

Figure 6:
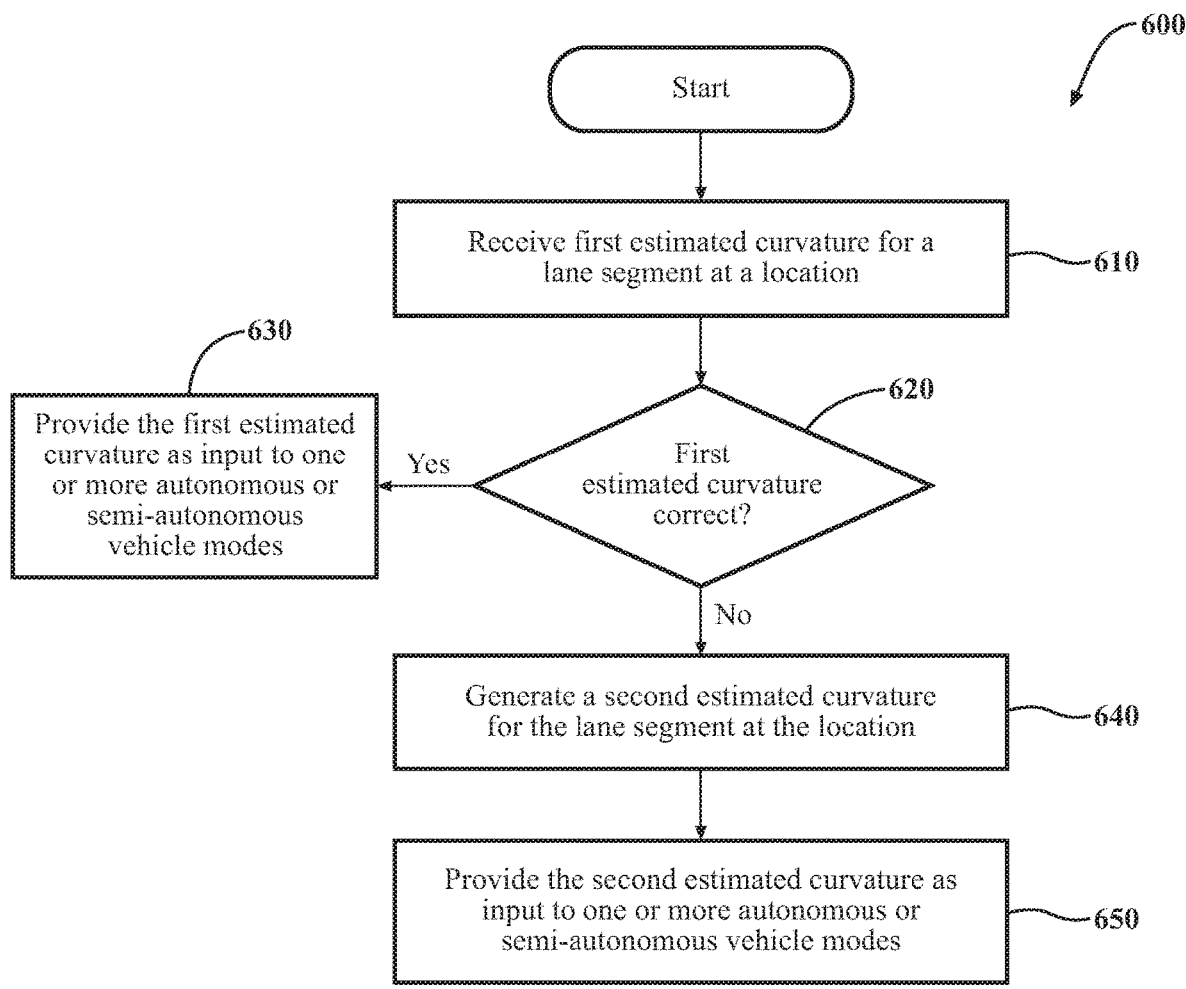
FIG. 6 illustrates a flowchart of a method that is associated with determining if an estimated curvature is correct using a lane curvature model.

Additional aspects of estimating a lane error will be discussed in in relation to FIG. 6. FIG. 6 illustrates a flowchart of a method 600 that is associated with determining if an estimated curvature is correct using a lane curvature model 270. The method 600 will be discussed from the perspective of the lane curvature system 170 of FIGS. 1, 2, and 3. While the method 600 is discussed in combination with the lane curvature system 170, it should be appreciated that the method 600 is not limited to being implemented within the lane curvature system 170 but is instead one example of a system that may implement the method 600.

At 610, the curvature correction module 230 receives a first estimated curvature of a lane segment at a location for a vehicle 100. The first estimated curvature may be for a lane segment that the vehicle 100 is currently, or about to, travel in. The estimated curvature may have been generated by a curvature estimation module 220 from sensor data 250 collected by one or more sensors of the vehicle 100.

In some embodiments, the curvature correction module 230 may receive an estimated curvature for each lane segment that the vehicle 100 travels in. In another embodiment, the curvature correction module 230 may receive estimated curvatures for lane segments at locations where the vehicle 100 believes that there may be an error or problem with respect to an estimated curvature for a lane segment. For example, an error or confidence in an estimated curvature may be above or below a threshold value. In another example, the vehicle 100 may recognize certain environmental conditions associated with lane curvature estimation errors. These conditions may include weather conditions (e.g., rain, snow) and the position of the sun which may cause sensor issues due to glare.

At 620, the curvature correction module 230 determines if the first estimated curvature is a correct curvature using the lane curvature model 270. Based on the numerous lane curvature estimations and vehicle path curvatures used to train the lane curvature model 270, the lane curvature model 270 may have learned the best lane curvature estimate received for the lane segment at the location (i.e., the lane curvature estimation that most closely matched the curvature of the vehicle path). Depending on the embodiment, the first estimated curvature may be deemed to be correct if it is close to, or within some margin of error of, the best or correct lane curvature estimate as determined by the lane curvature model 270.

If it is determined that the first estimated curvature is correct, the method 600 may continue at 630. Else, the method may continue at 640.

At 630, the curvature correction module 230 provides the first estimated curvature to one or more autonomous or semi-autonomous vehicle modes associated with the vehicle 100. The curvature correction module 230 may provide the first estimated curvature or may alternatively provide an instruction to the vehicle 100 indicating that the first estimated curvature was correct.

At 640, the curvature correction module 230 generates a second estimated curvature for the lane segment at the location. The curvature correction module 230 may generate the second estimated curvature using the lane curvature model 270. The second estimated curvature may be the best or most correct lane curvature estimated received for the identified lane segment location.

At 650, the curvature correction module 230 provides the second estimated curvature to one or more autonomous or semi-autonomous vehicle modes associated with the vehicle 100. Alternatively, the lane curvature may provide an offset or difference between the first estimated curvature and the second estimated curvature. The offset may be used by the one or more autonomous or semi-autonomous vehicle modes to adjust the first estimated curvature.

Figure 7:
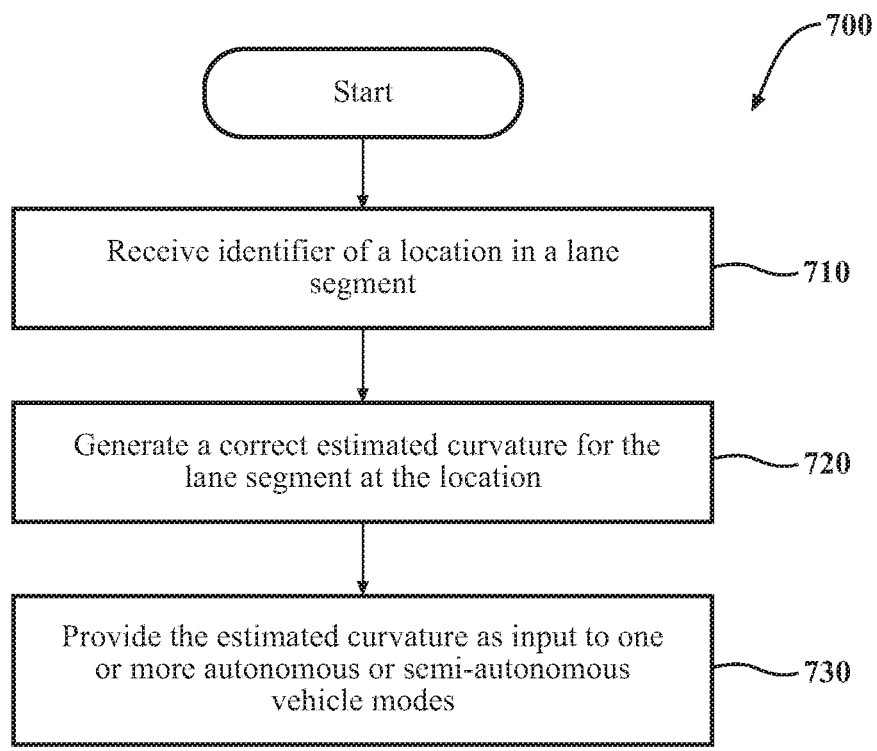
FIG. 7 illustrates a flowchart of a method that is associated with generating a lane curvature estimate using a lane curvature model.

Additional aspects of estimating a lane error will be discussed in in relation to FIG. 7. FIG. 7 illustrates a flowchart of a method 700 that is associated with generating a correct lane curvature using a lane curvature model 270. The method 700 will be discussed from the perspective of the lane curvature system 170 of FIGS. 1, 2, and 3. While the method 700 is discussed in combination with the lane curvature system 170, it should be appreciated that the method 700 is not limited to being implemented within the lane curvature system 170 but is instead one example of a system that may implement the method 700.

At 710, the curvature correction module 230 receives an identifier of a location in a lane segment. The lane segment is a lane segment that a vehicle 100 is currently, or about to, travel in. The location may be a location at a predetermined distance in front of the vehicle 100.

At 720, the curvature correction module 230 generates a correct curvature estimate for the lane segment at the location using the lane curvature model 270. Based on the numerous lane curvature estimations and vehicle path curvatures used to train the lane curvature model 270, the lane curvature model 270 may have learned the best lane curvature estimate received for the lane segment at the location (i.e., the lane curvature estimation that most closely matched the curvature of the vehicle path).

At 730, the curvature correction module 230 provides the generated correct curvature estimate to one or more autonomous or semi-autonomous vehicle modes associated with the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the lane curvature system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the lane curvature system 170, and/or the autonomous driving module(s) 160 may control some or all of these vehicle systems 140 and, thus, may be partially or fully autonomous.

The processor(s) 110, the lane curvature system 170, and/or the autonomous driving module(s) 160 can be operatively connected to communicate with the various vehicle systems 140 and/or individual components thereof. For example, returning to FIG. 1, the processor(s) 110, the lane curvature system 170, and/or the autonomous driving module(s) 160 can be in communication to send and/or receive information from the various vehicle systems 140 to control the movement, speed, maneuvering, heading, direction, etc. of the vehicle 100. The processor(s) 110, the lane curvature system 170, and/or the autonomous driving module(s) 160 may control some or all of these vehicle systems 140.

The processor(s) 110, the lane curvature system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the lane curvature system 170, and/or the autonomous driving module(s) 160 can control the direction and/or speed of the vehicle 100. The processor(s) 110, the lane curvature system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the lane curvature system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A lane curvature system for determining lane curvature estimates, comprising:
   one or more processors;
   a memory communicably coupled to the one or more processors and storing:
      a curvature estimation module including instructions that when executed by the one or more processors cause the one or more processors to:
         receive first sensor data from one or more sensors associated with a vehicle traveling on a first lane segment of a plurality of lane segments; and
         according to the received first sensor data, estimate a curvature of the first lane segment at a first location in the first lane segment; and
      a curvature correction module including instructions that when executed by the one or more processors cause the one or more processors to:
         determine a path traveled by the vehicle in the first lane segment;
         determine a curvature of the path traveled by the vehicle in the first lane segment;
         determine a difference for the first lane segment between the estimated curvature of the first lane segment at the first location and the determined curvature of the path traveled by the vehicle in the first lane segment; and
         provide the determined difference for the first lane segment, the estimated curvature of the first lane segment at the first location, and an identifier of the first location in the first lane segment as first training data to a lane curvature model.

2. The lane curvature system of claim 1, wherein the curvature correction module includes instructions to:
   receive an identifier of a second location in a second lane segment of the plurality of lane segments; and
   according to the identifier of the second location in the second lane segment and the lane curvature model, generate an estimated curvature of the second lane segment at the second location in the second lane segment.

3. The lane curvature system of claim 2, wherein the curvature correction module includes instructions to:
   provide the estimated curvature of the second lane segment at the second location as input to one or more autonomous or semi-autonomous vehicle modes.

4. The lane curvature system of claim 3, wherein the one or more autonomous or semi-autonomous vehicle modes comprise lane assist.

5. The lane curvature system of claim 1, wherein the curvature correction module includes instructions to:
   receive an identifier of a second location in a second lane segment of the plurality of lane segments;
   receive a first estimated curvature of the second lane segment at the second location;
   according to the identifier of the second location in the second lane segment and the lane segment curvature model, determine if the first estimated curvature of the second lane segment at the second location is correct; and
   if it is determined that the first estimated curvature of the second lane segment at the second location is correct, provide the first estimated curvature of the second lane segment at the second location as input to one or more autonomous or semi-autonomous vehicle modes.

6. The lane curvature system of claim 5, wherein the curvature correction module includes instructions to:
   if it is not determined that the first estimated curvature of the second lane segment at the second location is correct, generate a second estimated curvature for the second lane segment at the second location according to the identifier of the second location in the second lane segment and the lane curvature model; and
   provide the second estimated curvature of the second lane segment at the second location as input to the one or more autonomous or semi-autonomous vehicle modes.

7. The lane curvature system of claim 1, wherein at least one of the one or more processors is part of the vehicle or a cloud-computing environment.

8. The lane curvature system of claim 1, wherein curvature estimation module further includes instructions to:
receive second sensor data from the one or more sensors associated with the vehicle traveling on a second lane segment of the plurality of lane segments; and
according to the received second sensor data, estimate a curvature of the second lane segment at a second location.

9. The lane curvature system of claim 8, wherein the curvature correction module further includes instructions to:
determine a path traveled by the vehicle in the second lane segment;
determine a curvature of the path traveled by the vehicle in the second lane segment;
determine a difference for the second lane segment between the estimated curvature of the second lane segment and the determined curvature of the path traveled by the vehicle in the second lane segment; and
provide the determined difference for the second lane segment, the estimated curvature of the second lane segment, and an identifier of the second location in the second lane segment as second training data to the lane curvature model.

10. A method for determining a lane curvature estimate, comprising:
receiving a first estimated curvature of a lane segment of a plurality lane segments at a location for a first vehicle traveling in the lane segment;
receiving a path traveled by the first vehicle in the lane segment;
determining a curvature of the path traveled by the first vehicle in the lane segment;
determining a difference between the first estimated curvature of the lane segment at the location and the determined curvature of the path traveled by the first vehicle; and
providing the determined difference, the first estimated curvature of the lane segment, and an identifier of the location in the lane segment as training data to a lane curvature model.

11. The method of claim 10, further comprising:
receiving an identifier of the location in the lane segment for a second vehicle; and
according to the identifier of the location in the lane segment and the lane curvature model, generating a second estimated curvature of the lane segment at the location.

12. The method of claim 11, further comprising:
providing the second estimated curvature of the lane segment at the location as input to one or more autonomous or semi-autonomous vehicle modes.

13. The method of claim 12, wherein the one or more autonomous or semi-autonomous vehicle modes comprise lane assist.

14. The method of claim 10, further comprising:
receiving a second estimated curvature of the lane segment at the location for a second vehicle;
according to an identifier of the location in the lane segment and the lane curvature model, determining if the second estimated curvature of the lane segment at the location is correct; and
if it is determined that the second estimated curvature of the lane segment at the location is correct, providing the second estimated curvature of the lane segment at the location as input to one or more autonomous or semi-autonomous vehicle modes.

15. The method of claim 14, further comprising:
if it is not determined that the second estimated curvature of the lane segment at the location is correct, generating a third estimated curvature for the lane segment at the location for the second vehicle according to the identifier of the location in the lane segment and the lane curvature model; and
providing the third estimated curvature of the lane segment at the location as input to the one or more autonomous or semi-autonomous vehicle modes.

16. The method of claim 10, wherein the method is implemented in part by one or both of the first vehicle or a cloud-computing environment.

17. A non-transitory computer-readable medium for determining a lane curvature estimate and including instructions that when executed by one or more processors cause the one or more processors to:
receive an identifier of a first location in a first lane segment of a plurality of lane segments for a first vehicle traveling on the first lane segment;
according to the identified first location in the first lane segment and a lane curvature model, generate a first estimated curvature for the first lane segment at the first location; and
provide the first estimated curvature of the first lane segment at the first location as input to one or more autonomous or semi-autonomous vehicle modes.

18. The non-transitory computer-readable medium of claim 17, wherein the one or more autonomous or semi-autonomous vehicle modes comprises lane assist.

19. The non-transitory computer-readable medium of claim 17, further including instructions to:
receive an identifier of a second location of a second lane segment of the plurality of lane segments for a second vehicle traveling on the second lane segment;
according to the identified second location of the second lane segment and the lane curvature model, generate a second estimated curvature for the second lane segment at the second location; and
provide the second estimated curvature of the second lane segment at the second location as input to the one or more autonomous or semi-autonomous vehicle modes.

20. The non-transitory computer-readable medium of claim 17, wherein at least one of the one or more processors is part of the first vehicle or a cloud-computing environment.

* * * * *